E. O. WOOD.

Till-Alarms.

No. 5,820. Reissued March 31, 1874.

Witnesses;

A. Bonnemann Jr.

C. Seiguet

Inventor;

E. O. Wood

Munn & Co.

AM. PHOTO-LITHOGRAPHIC Co. N. Y. (OSBORNE'S PROCESS.)

UNITED STATES PATENT OFFICE.

EGBERT O. WOOD, OF NASHUA, NEW HAMPSHIRE.

IMPROVEMENT IN TILL-ALARMS.

Specification forming part of Letters Patent No. 145,824, dated December 23, 1873; reissue No. 5,820, dated March 31, 1874; application filed February 28, 1874.

*To all whom it may concern:*

Figure 1:
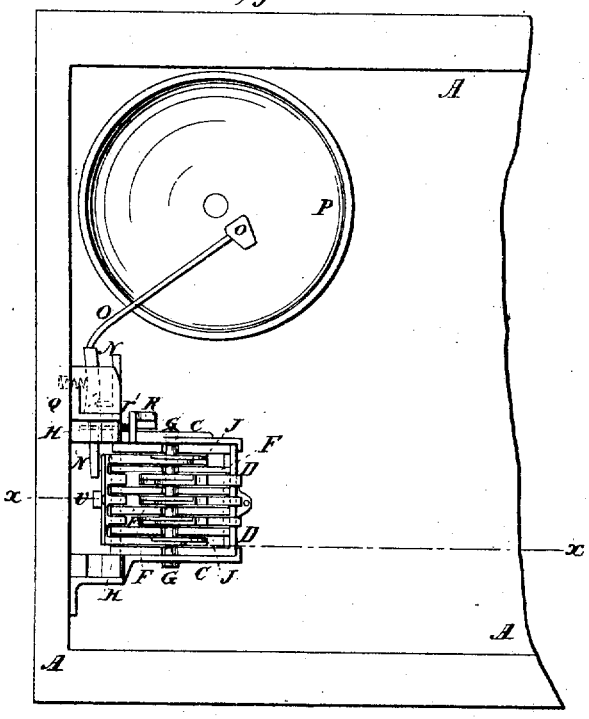
Figure 2:
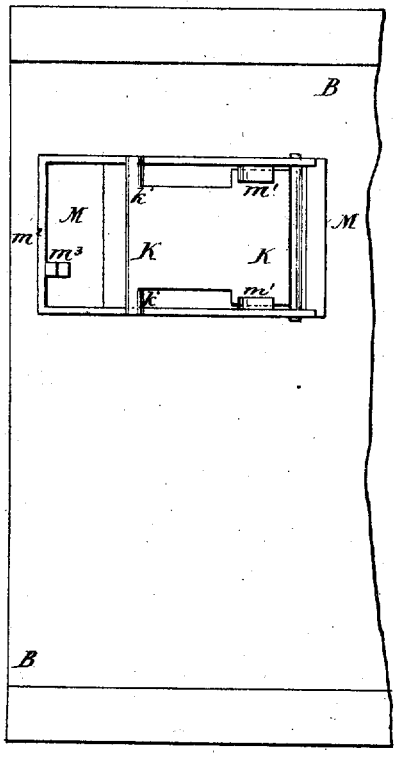
Figure 3:
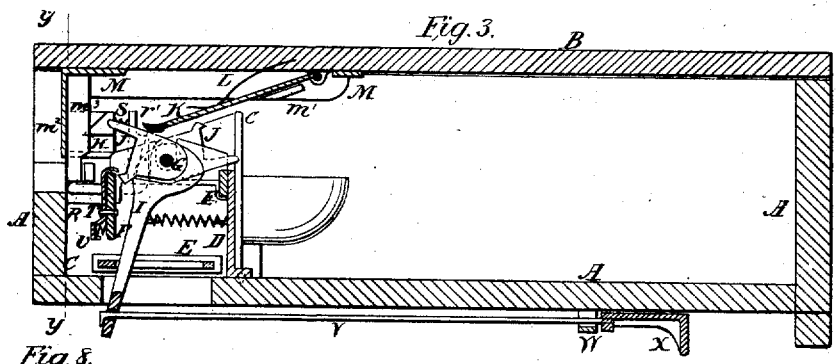
Figure 5:
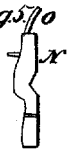
Figure 6:
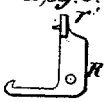
Figure 7:
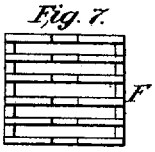
Figure 8:
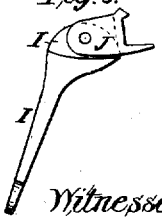
Figure 4:
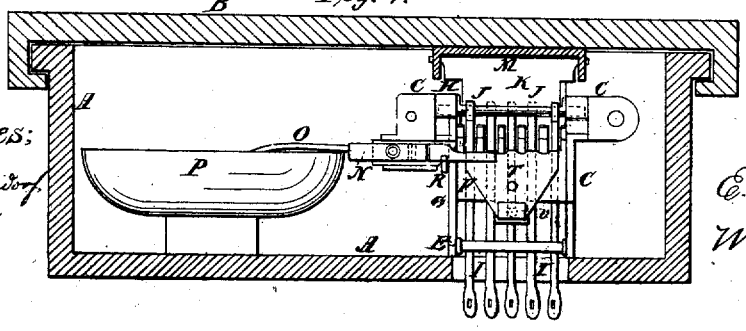

Be it known that I, EGBERT O. WOOD, of Nashua, in the county of Hillsborough and State of New Hampshire, have invented a new and useful Improvement in Till-Alarms, of which the following is a specification:

Figure 1 is a top view of the part of my improved device attached to the till. Fig. 2 is an under-side view of the part of my improved device attached to the cover. Fig. 3 is a vertical section taken through the line *x x*, Fig. 1. Fig. 4 is a vertical section taken through the line *y y*, Fig. 3. Fig. 5 is a detail top view of the lever for sounding the alarm. Fig. 6 is a detail side view of the ratchet. Fig. 7 is a detail top view of the bed. Fig. 8 is a detail side view of a tumbler and key.

Similar letters of reference indicate corresponding parts.

In my improved till the keys and tumblers are so connected in pairs, and arranged relatively to locking and alarm-operating devices, as to act on the same in a peculiar way; also, the lock-plate operates in connection with inclined lugs, passing alternately beneath and above them as the drawer is moved, all as hereinafter described.

A represents the till or drawer, and B is the cover to which my device has been attached. The cover B may be a counter, table, desk, or other stationary board, to which are attached the cleats upon which the till or drawer A slides. C are the side plates of the box, which are secured to the rear or inner end of the till A by screws passing through lugs formed upon the upper rear part of said plates. D is the front plate, the edges of which fit into shallow grooves cast in the forward part of the inner sides of said plates C. E is the slotted bottom plate or rack, through which the keys or levers pass, and the side edges of which enter grooves cast in the lower part of the inner sides of the plates C. F is the bed, the lower edges of the sides of which rest upon flanges cast upon the upper part of the plates C. The side plates C are secured to each other, clamping the front plate D, the slotted bottom plate E, and the bed F between them by a bolt and nut, G, which bolt passes through a transverse groove in the upper part of the ribs or partitions of said bed F. The bed F is slotted longitudinally, or is formed of a frame, the front and rear bars of which are connected by four, more or less, partitions, parallel with each other, and with the side bars of said frame, as shown in Fig. 7. Upon an upward projection upon the rear part of the side plates C are formed lugs H, made with horizontal sides, vertical forward sides, and inclined upper or rear sides, as shown in Fig. 2. Upon the bolt G are strung the levers or keys I and the tumblers J, a key and tumbler being placed in each slot of the bed F. The adjacent sides of the pivoted parts of the keys I and tumblers J are halved to each other, so as to form shoulders to enable the tumblers to be moved by the movement of the levers, whether the said tumblers be turned forward or back. K is the lock-plate, upon the rear ends of the side edges of which are formed lugs $k'$, of such a size as to pass through the space below the lugs H. The rear end of the plate K is held down by a spring, L, placed above it, and secured to the board B by the plate M, to the forward part of which the said lock-plate is pivoted. The downward movement of the plate K is limited by flanges $m^1$, cast upon the plate M. Upon the rear end of the plate M is cast a downwardly-projecting flange, $m^2$, which, when the till or drawer is closed, enters a notch in the rear end of the said till or drawer, and covers and protects the operating parts of the device. Upon the forward side of the flange $m^2$ is cast a projection, $m^3$, against which, when the drawer A is pushed in, strikes the lever N, to which the hammer O of the bell P is attached, and sets said lever N. The lever N has a notch cast in it to receive the pivoting-flange cast upon the plate C, and a pin cast upon it to receive the spring Q, by the elasticity of which the hammer is thrown forward to strike the bell when the lever N is released from the ratchet R. The ratchet R is made in the shape shown in Fig. 6, and is pivoted to the plate C in such a position that its lug $r'$ may project along the forward side of the lug H, so as to be struck by lug $k'$ of the lock-plate K. The ratchet R is held in position for its hook end to catch upon the lever N by a coiled spring, S, interposed between the lug $r'$ of said ratchet and the inclined lug H, as shown in Fig. 3. The tumbler J is made with a short arm upon the rear part, and a longer arm upon the forward part, of its upper or free end, as shown in Fig. 8. The end of the short arm of the tumblers J is so formed as to catch upon the points or teeth of the comb T, which is loosely secured to the rear side of the bed F in such a position that its teeth, which project nearly at right angles with its plane, may project over the top edge of the rear bar of the frame of the bed F, between the partitions or ribs of said bed, and thus serve as catches to receive the ends of the short arms of the tumblers J, and prevent them from being turned over accidentally by the friction of the plate K in opening the drawer. The teeth of the comb T are held forward in position to receive the short arms of the tumblers J, and said plate is made to yield, to allow said short arms to pass in and out, by a coiled spring, U, interposed between its lower part and the rear side of the bed F, as shown in Fig. 3. The keys I are operated by rods V, attached to their lower ends, and which pass through guides W, attached to the bottom of the till or drawer A, and have finger-pieces X attached to their forward ends.

With this construction, when the tumblers are all turned forward, so that their short arms project upward, the drawer may be moved out and in freely. Should one or more of the tumblers J be turned back, so that their long arms project upward, the drawer cannot be drawn out without first forcing the said long arm of the tumbler or tumblers downward by operating the keys of the tumbler or tumblers that were turned back. When the key of a tumbler that has been turned forward is operated, the short arm of said tumbler is raised so as to prevent the plate K from dropping down and passing out beneath the lug H. When an attempt is made to open the drawer with one or more of the tumblers raised, the lug $k'$ of the plate K′ will strike against the lug $r'$ of the ratchet R, and, releasing the lever N, will sound the alarm. As the till or drawer is closed, the lugs $k'$ of the plate K slide up the inclined rear sides of the lugs H, and drop down in front of said lugs H, the rear part of the said plate K resting upon the upwardly-projecting arms of the tumblers J.

The alarm is set by turning one or more of the tumblers J to the rearward, and the combination is changed by turning one or more of the tumblers forward or back, as may be desired.

Having thus described my invention, what I claim is—

1. The tumblers J and keys I, constructed substantially as herein shown and described, in combination with the bed F, bolt G, and lock-plate K, as and for the purposes set forth.

2. The inclined lugs H, formed on the side plates C, in combination with a hinged lock-plate, K, provided with lugs K′, to operate substantially as and for the purpose specified.

EGBERT O. WOOD.

Witnesses:
E. E. PARKER,
JOHN T. BALDWIN.